US012503888B2

(12) United States Patent
Duci

(10) Patent No.: US 12,503,888 B2

(45) Date of Patent: Dec. 23, 2025

(54) LOCKING AND RELEASE SYSTEM OF A LOCK FITTED ON A VEHICLE

(71) Applicant: EFFEDI MECCANOTEK S.R.L., Vilminore di Scalve (IT)

(72) Inventor: Ottavio Duci, Vilminore di Scalve (IT)

(73) Assignee: EFFEDI MECCANOTEK S.R.L., Vilminore di Scalve (IT)

( * ) Notice: Subject to any disclaimer, the term of this patent is extended or adjusted under 35 U.S.C. 154(b) by 228 days.

(21) Appl. No.: 18/019,514

(22) PCT Filed: Jul. 29, 2021

(86) PCT No.: PCT/IB2021/056918

§ 371 (c)(1),
(2) Date: Feb. 3, 2023

(87) PCT Pub. No.: WO2022/029572

PCT Pub. Date: Feb. 10, 2022

(65) Prior Publication Data

US 2023/0220704 A1 Jul. 13, 2023

(30) Foreign Application Priority Data

Aug. 5, 2020 (IT) ........................ 102020000019339

(51) Int. Cl.
*E05B 81/90* (2014.01)
*E05B 81/18* (2014.01)
(Continued)

(52) U.S. Cl.
CPC .............. *E05B 81/90* (2013.01); *E05B 81/18* (2013.01); *E05B 81/28* (2013.01); *E05B 85/22* (2013.01); *E05B 85/245* (2013.01)

(58) Field of Classification Search
CPC .......... E05B 81/90; E05B 81/18; E05B 81/28; E05B 85/22; G07C 9/29;
(Continued)

(56) References Cited

U.S. PATENT DOCUMENTS 6,598,896 B1 7/2003 Hyslop
9,683,394 B1 6/2017 Rickrode
(Continued)

FOREIGN PATENT DOCUMENTS

WO 2018111643 A1 6/2018

*Primary Examiner* — Nam V Nguyen

(74) *Attorney, Agent, or Firm* — Dickinson Wright PLLC; Andrew D. Dorisio

(57) ABSTRACT

A locking and release system of a lock fitted on a vehicle comprising: a mechanical lock (10, 70) which is fixed on a door of a vehicle; an electronic circuit (11) associated with said lock (10, 70); said electronic circuit (11) comprises a Bluetooth communication device (13); an Internet communication device (14); a GPS localization device (15); said system further comprises: a cloud (30) containing the data for the management of said system; a management centre (35) of said system; said management centre (35) is adapted to communicate with said cloud (30); a smartphone (21); said smartphone (21) comprises a Bluetooth communication device (22); an HTTPS communication device (23); and a GPS localization device (24); said electronic circuit (11) and said smartphone (21) are adapted to communicate with said cloud (30); said smartphone (21) is adapted to communicate with said electronic circuit (11); said lock (10, 70) opens if the following conditions are met: the GPS position of the
(Continued)

lock (10, 70) coincides with the delivery position; the GPS position of the smartphone (21) coincides with the delivery position; said smartphone (21) is recognized by the system; said lock comprises coupling means (56, 74), located on a first door adapted to close against closing means (59, 71) located on a second door and locking means (60, 78) adapted to lock said coupling means (56, 74) in the closed position.

4 Claims, 7 Drawing Sheets

(51) Int. Cl.
*E05B 81/28* (2014.01)
*E05B 85/22* (2014.01)
*E05B 85/24* (2014.01)

(58) Field of Classification Search
CPC ........ G07C 2009/0092; G07C 9/00309; G07C 9/00563; G07C 9/00571; G07C 9/28; G07C 9/00944; G07C 2009/00952; G07C 9/27; G07C 9/257; G07C 2209/08; G07C 2209/62; G07C 2209/63
USPC .......................................................... 340/5.61
See application file for complete search history.

(56) References Cited

U.S. PATENT DOCUMENTS

| | | | | |
|---|---|---|---|---|
| 10,343,650 | B1 * | 7/2019 | Ahmad | G07C 9/00571 |
| 10,719,805 | B2 * | 7/2020 | Ferguson | G01C 21/3453 |
| 11,423,350 | B2 * | 8/2022 | Wiechers | B60R 25/23 |
| 11,425,546 | B2 * | 8/2022 | Ahearn | G07C 9/00571 |
| 11,562,317 | B2 * | 1/2023 | Kanaoka | G06Q 50/40 |
| 11,825,292 | B2 * | 11/2023 | Pirch | G07C 9/21 |
| 12,002,003 | B2 * | 6/2024 | Wiechers | G06Q 10/083 |
| 12,313,442 | B2 * | 5/2025 | Beaupre | G01G 19/10 |
| 2002/0044906 | A1 * | 4/2002 | Tabata | C01G 45/1242 423/599 |
| 2004/0094969 | A1 * | 5/2004 | Fisher | E05B 77/36 292/150 |
| 2015/0120094 | A1 * | 4/2015 | Kimchi | B64U 10/14 701/3 |
| 2016/0096508 | A1 * | 4/2016 | Oz | H04L 67/125 701/36 |
| 2016/0342943 | A1 * | 11/2016 | Wiechers | G07C 9/00309 |
| 2017/0154483 | A1 | 6/2017 | Cordiner | |
| 2017/0180539 | A1 * | 6/2017 | Payack, Jr. | H04M 1/72415 |
| 2017/0249794 | A1 | 8/2017 | Davis | |
| 2018/0025321 | A1 * | 1/2018 | Chen | G06Q 10/083 705/338 |
| 2018/0283051 | A1 * | 10/2018 | Qiu | G06K 19/0723 |
| 2021/0054653 | A1 * | 2/2021 | Bloom | G07C 9/00563 |
| 2021/0364299 | A1 * | 11/2021 | Takezawa | G01C 21/3415 |
| 2022/0129841 | A1 * | 4/2022 | Gutke | G08B 13/19602 |

* cited by examiner

LOCKING AND RELEASE SYSTEM OF A LOCK FITTED ON A VEHICLE

TECHNICAL FIELD

The present invention refers to a system and a method for locking and releasing a lock fitted on a vehicle, in particular to control access, granted only to authorized persons, to the goods inside the vehicle. The lock can also be fitted on other movable means or on cabinets or containers and similar.

BACKGROUND

As is known, various types of mechanical anti-theft systems exist, such as devices, padlocks, safety locks designed to physically prevent opening of the vehicle.

SUMMARY

Electronic safety systems used for the same purpose also exist.

The object of the present invention is to provide a secure locking and release system for a lock fitted on a vehicle.

A further object is to provide a system that prevents access by unauthorized persons.

In accordance with the present invention, said objects and others still are achieved by a system and a method for locking and release of a lock fitted on a vehicle in accordance with the attached claims.

Further characteristics of the invention are described in the dependent claims.

BRIEF DESCRIPTION OF THE DRAWING

The characteristics and advantages of the present invention will become evident from the following detailed description of a practical embodiment thereof, illustrated by way of non-limiting example in the attached drawings, in which.

DETAILED DESCRIPTION

Figure 1:
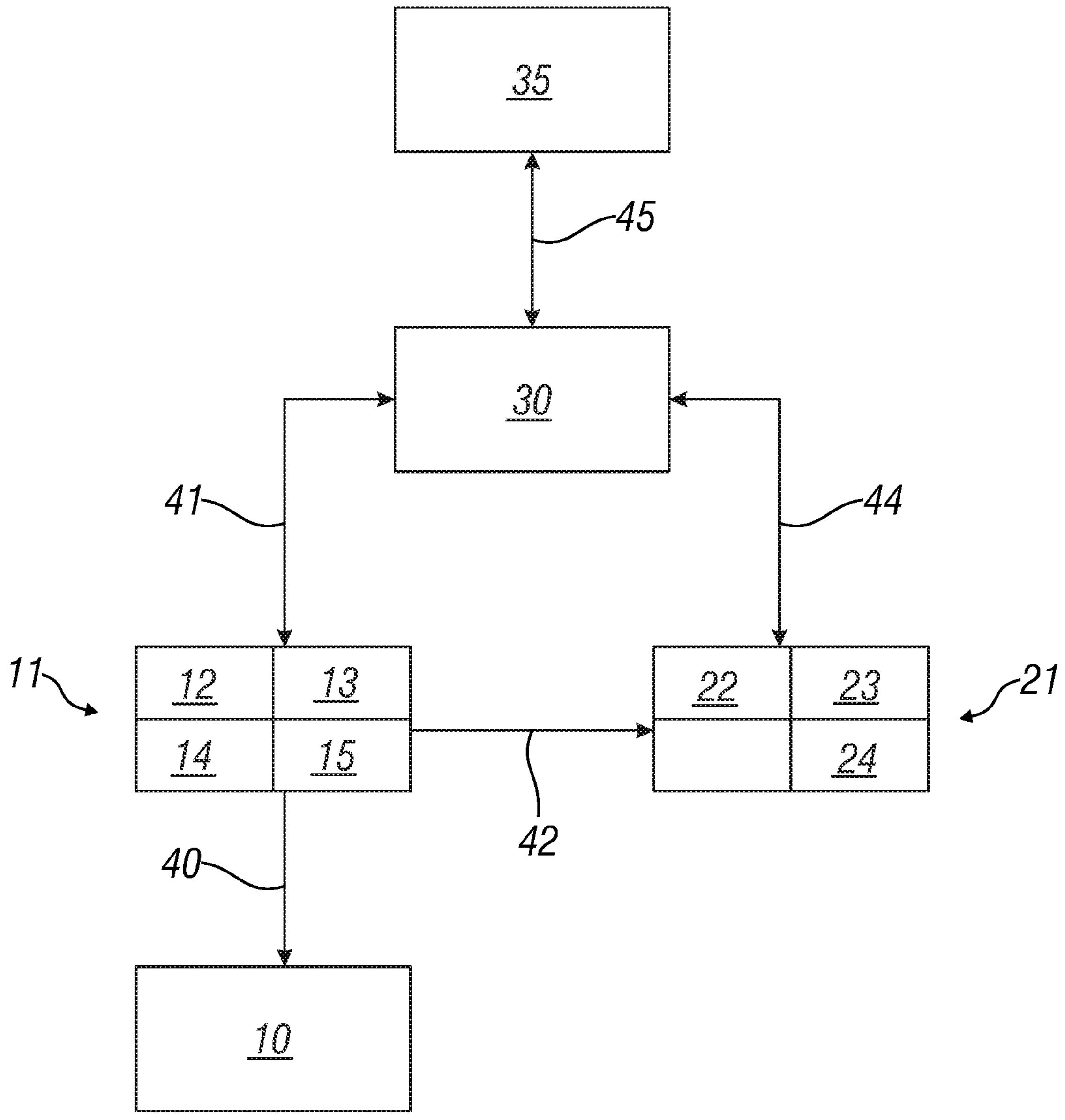
FIG. 1 shows the block diagram of a locking and release system of a lock fitted on a vehicle, in accordance with the present invention.
Figure 2:
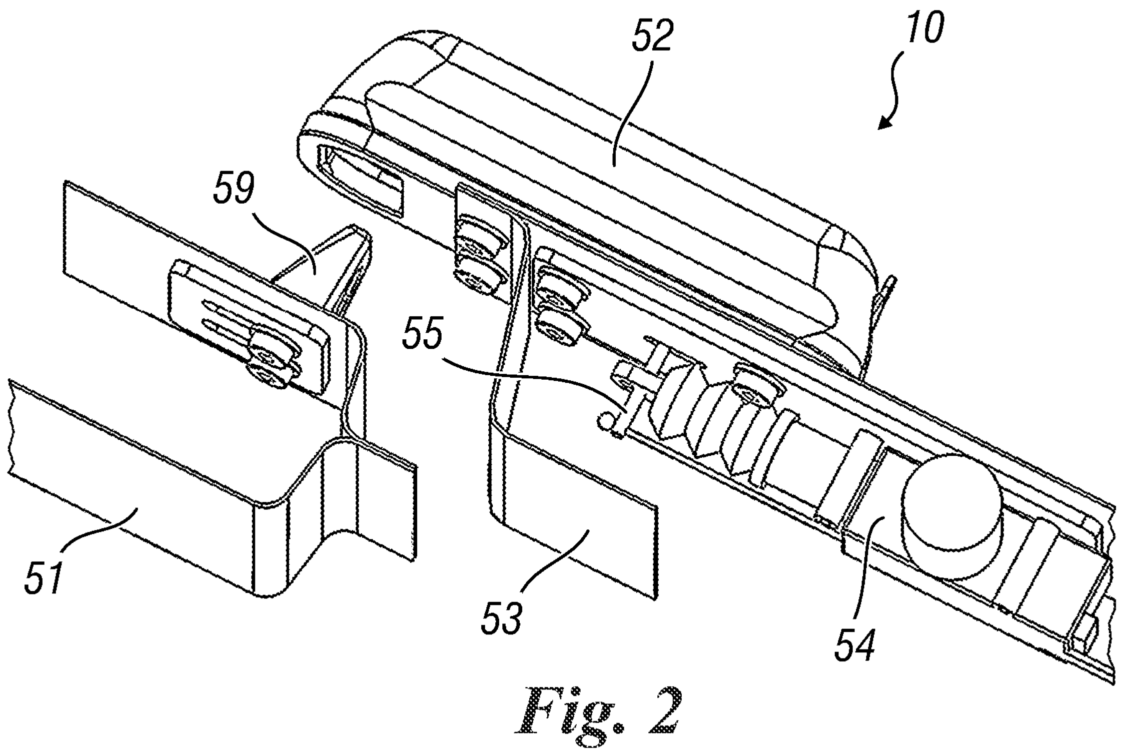
FIG. 2 shows an open lock, in accordance with the present invention.
Figure 3:
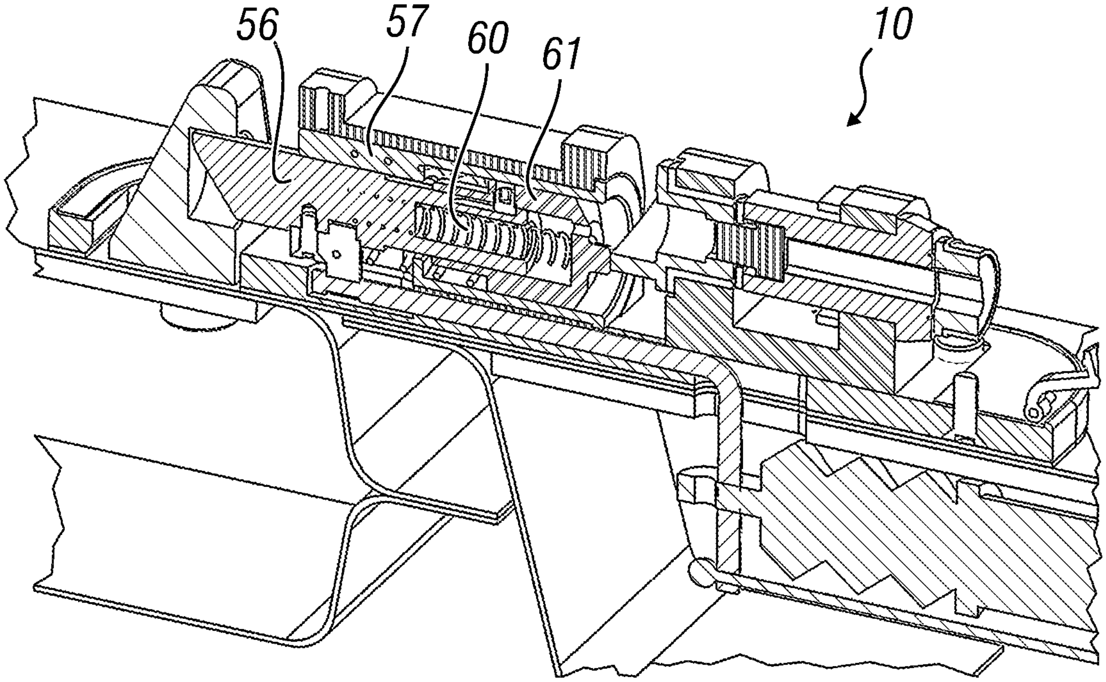
FIG. 3 shows a closed lock in section, in accordance with the present invention.
Figure 4:
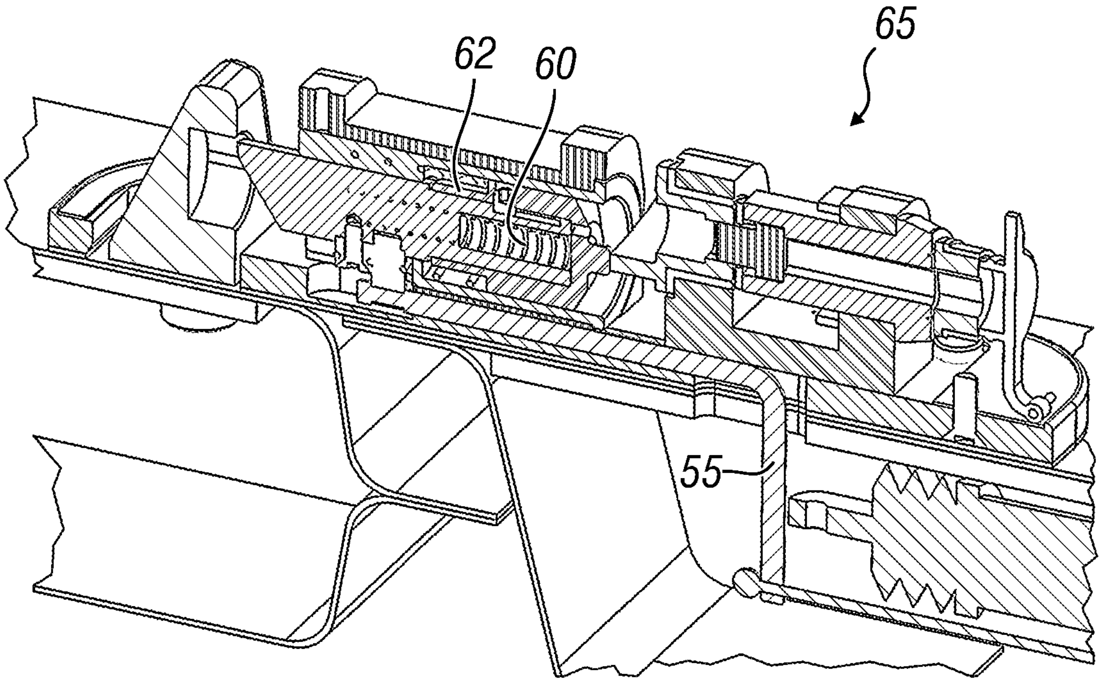
FIG. 4 shows an electronically opened lock in section, in accordance with the present invention.
Figure 5:
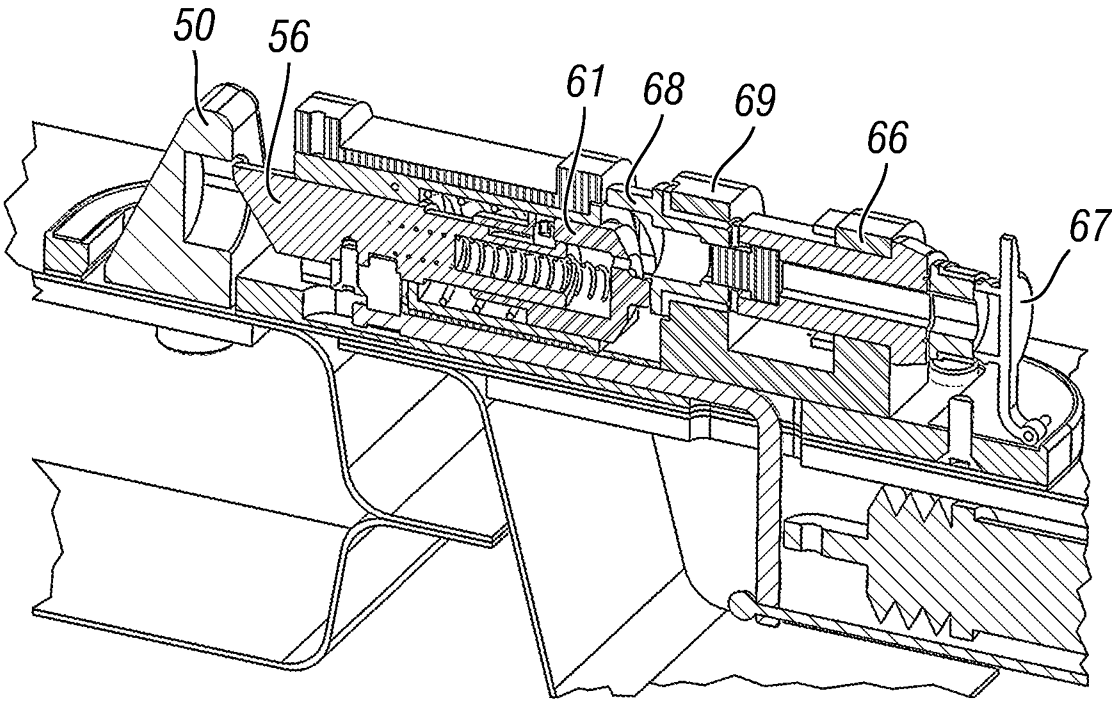
FIG. 5 shows a mechanically opened lock in section, in accordance with the present invention.
Figure 7:
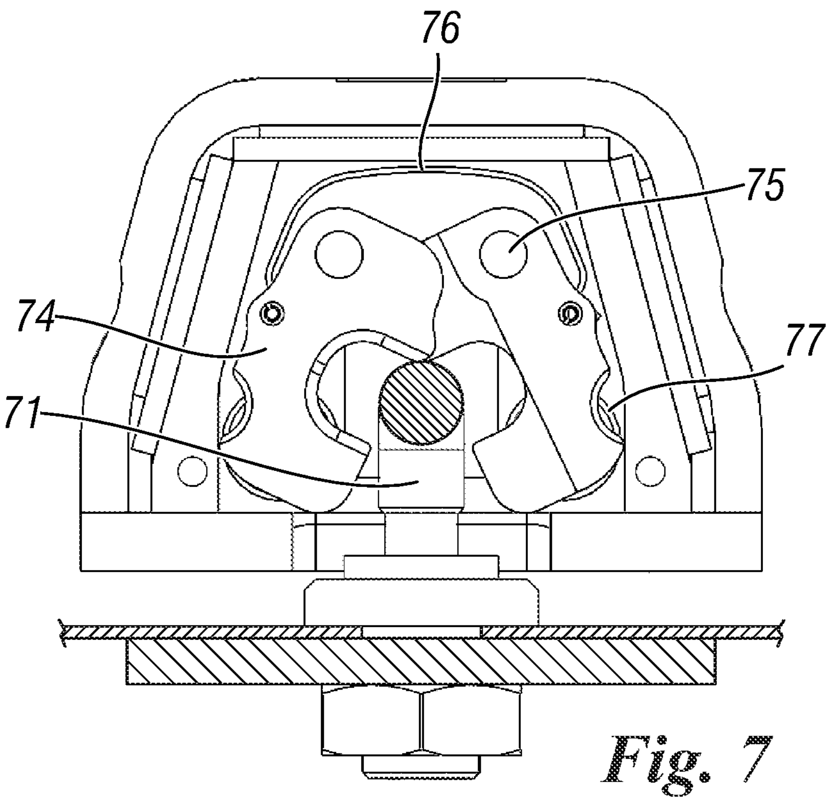
FIG. 7 shows a portion of a lock in a first closing step, in accordance with a variation of the present invention.
Figure 8:
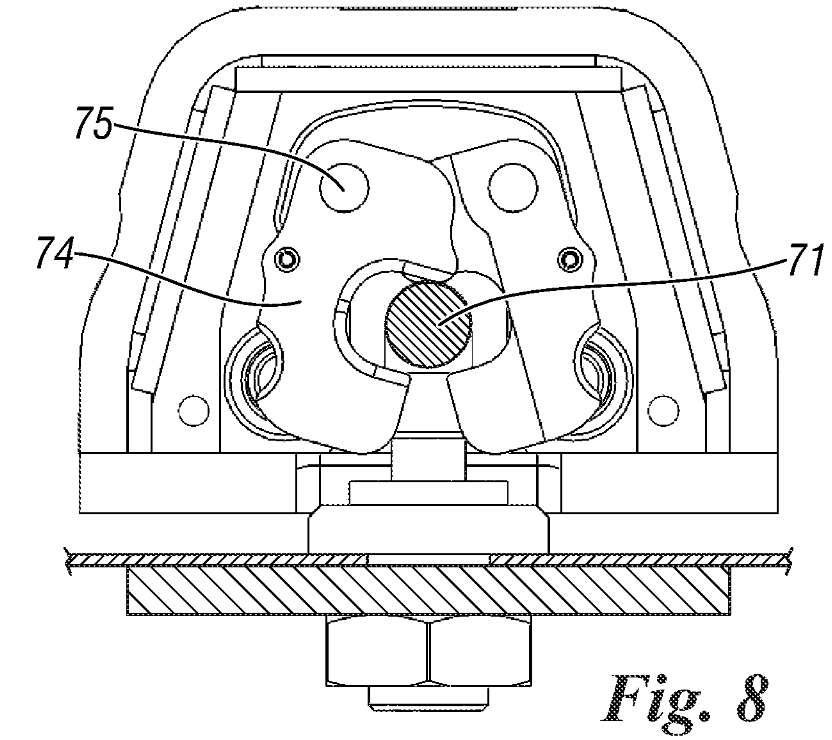
FIG. 8 shows a portion of a lock in a second closing step, in accordance with a variation of the present invention.
Figure 9:
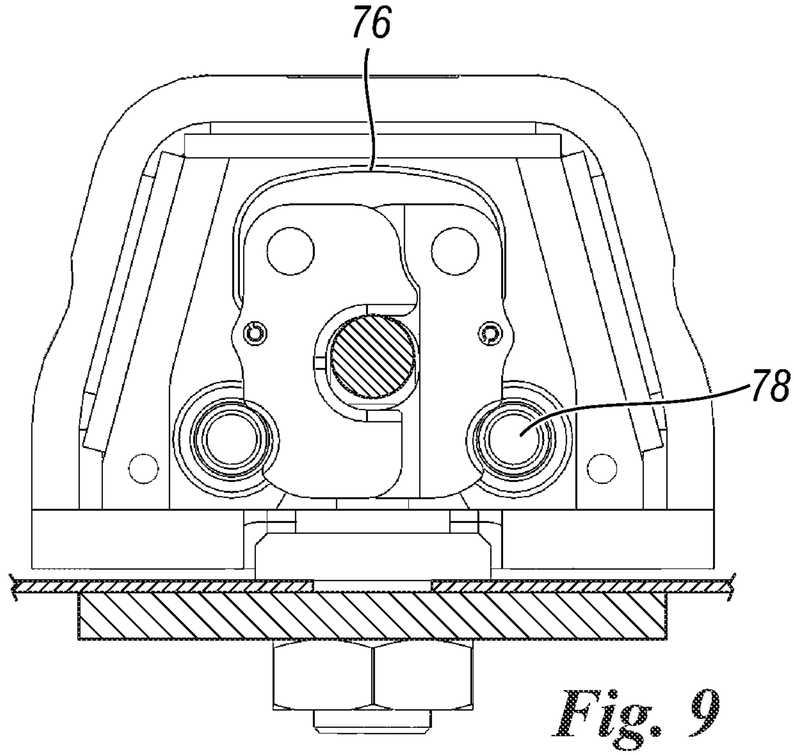
FIG. 9 shows a portion of a closed lock, in accordance with a variation of the present invention.
Figure 6:
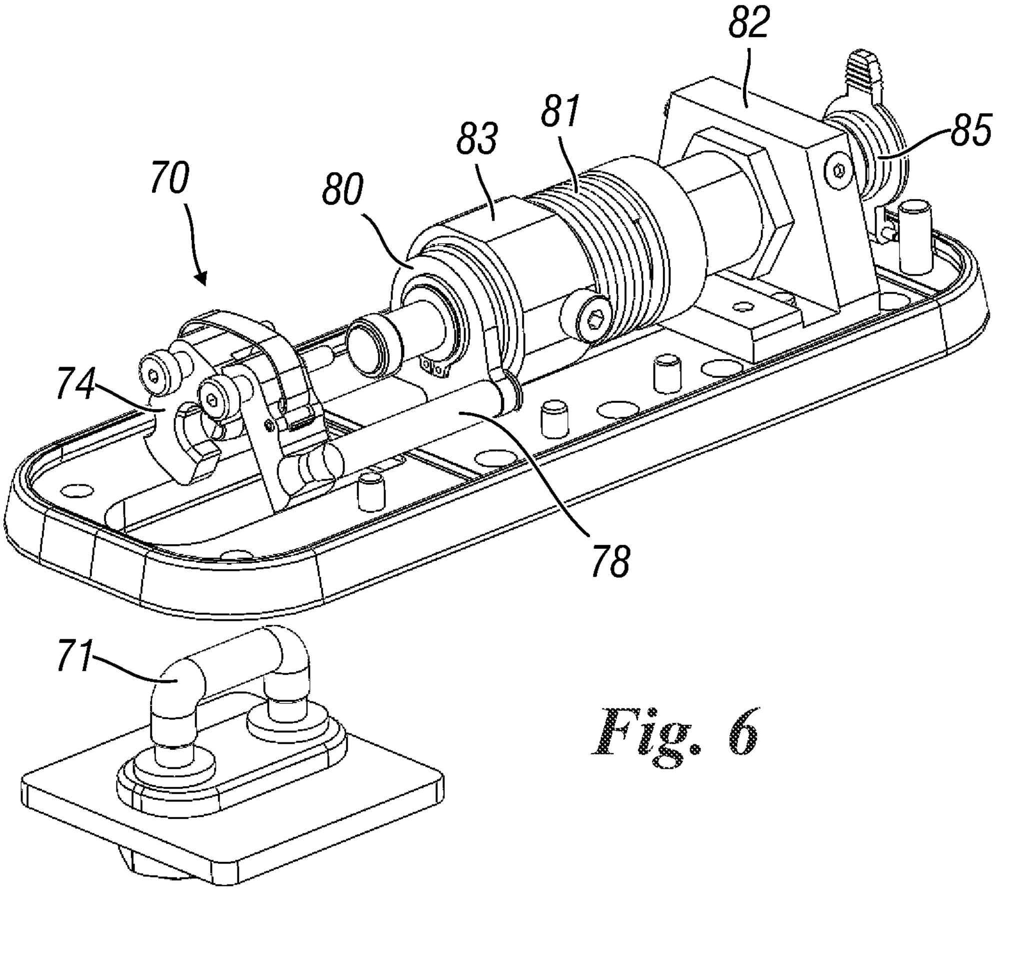
FIG. 6 shows an open lock, in accordance with a variation of the present invention.
Figure 10:
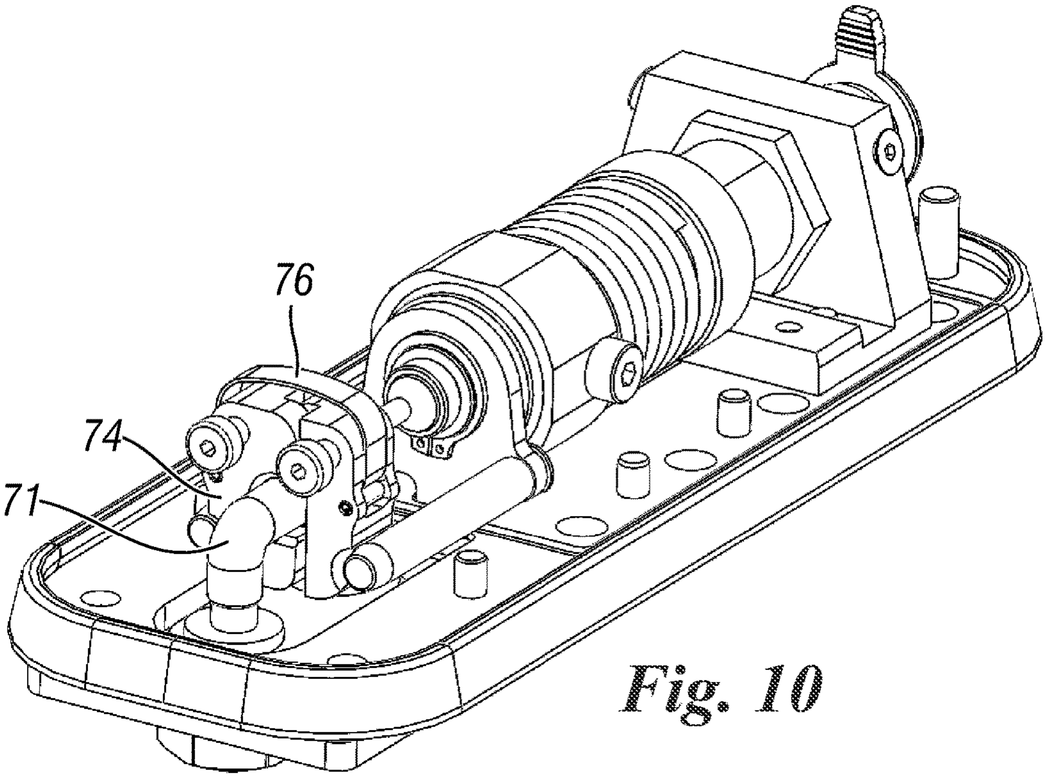
FIG. 10 shows a closed lock, seen in perspective, in accordance with a variation of the present invention.
Figure 11:
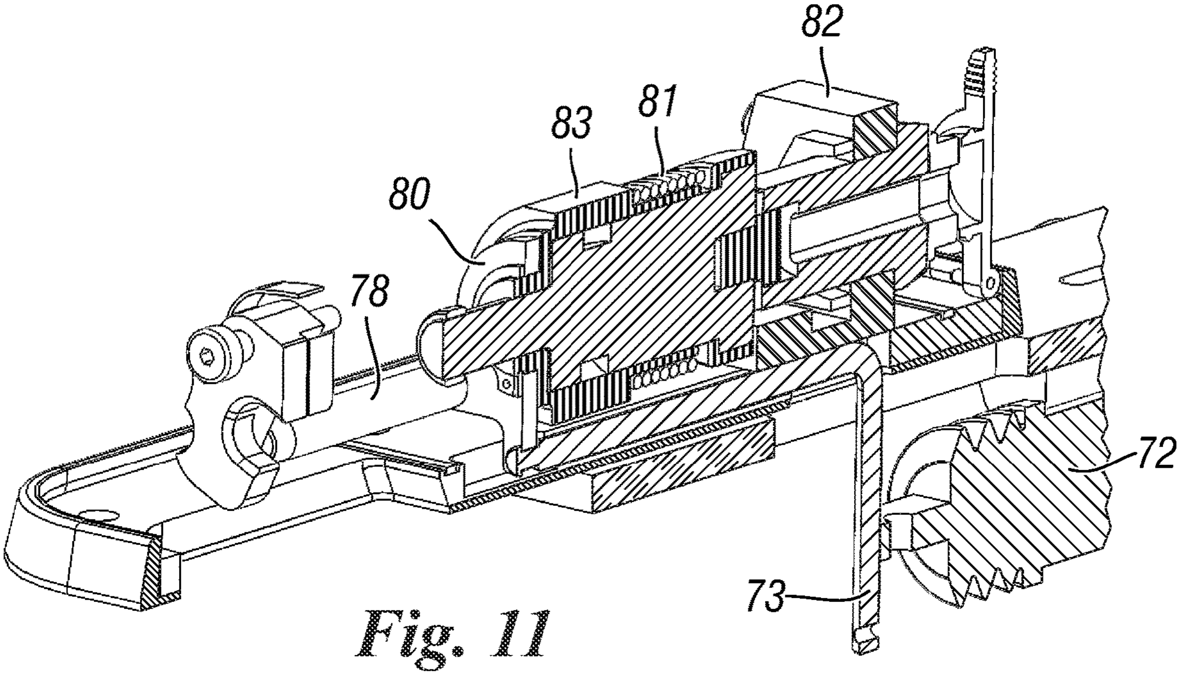
FIG. 11 shows an open lock in section, in accordance with a variation of the present invention.
Figure 12:
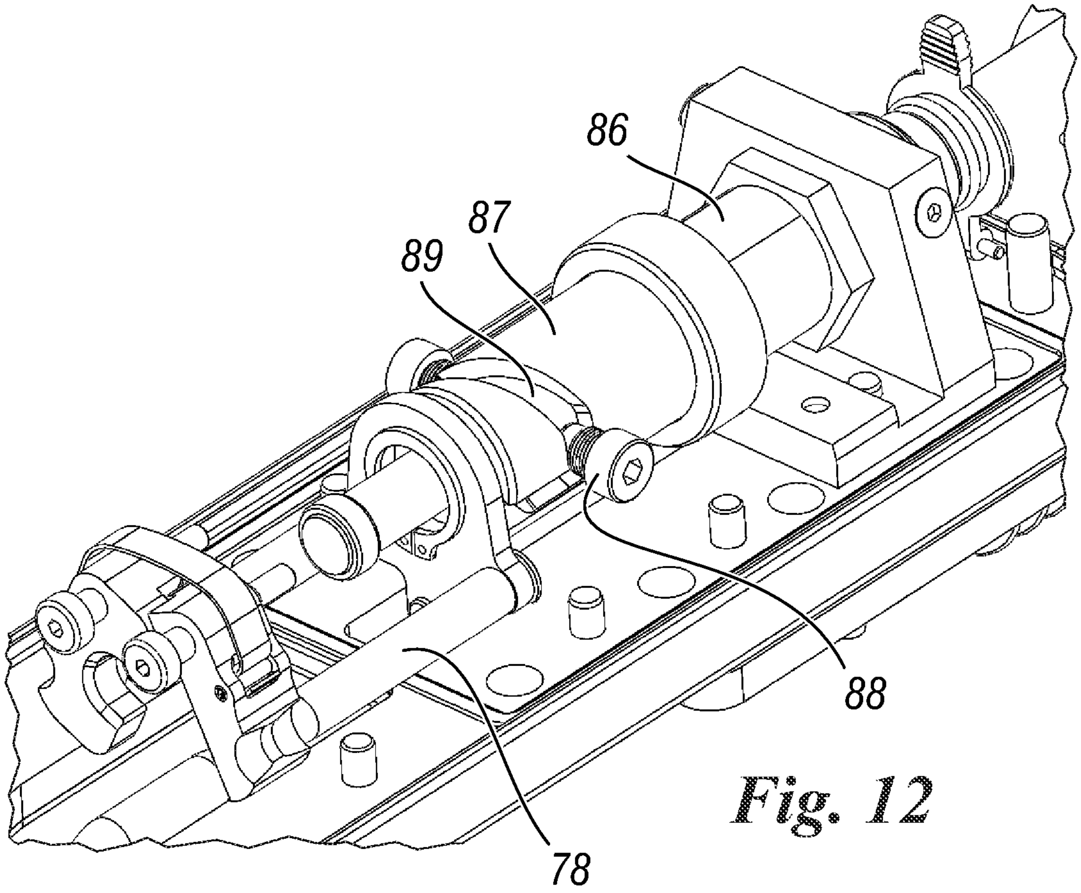
FIG. 12 shows part of a lock, in accordance with a variation of the present invention.
Figure 13:
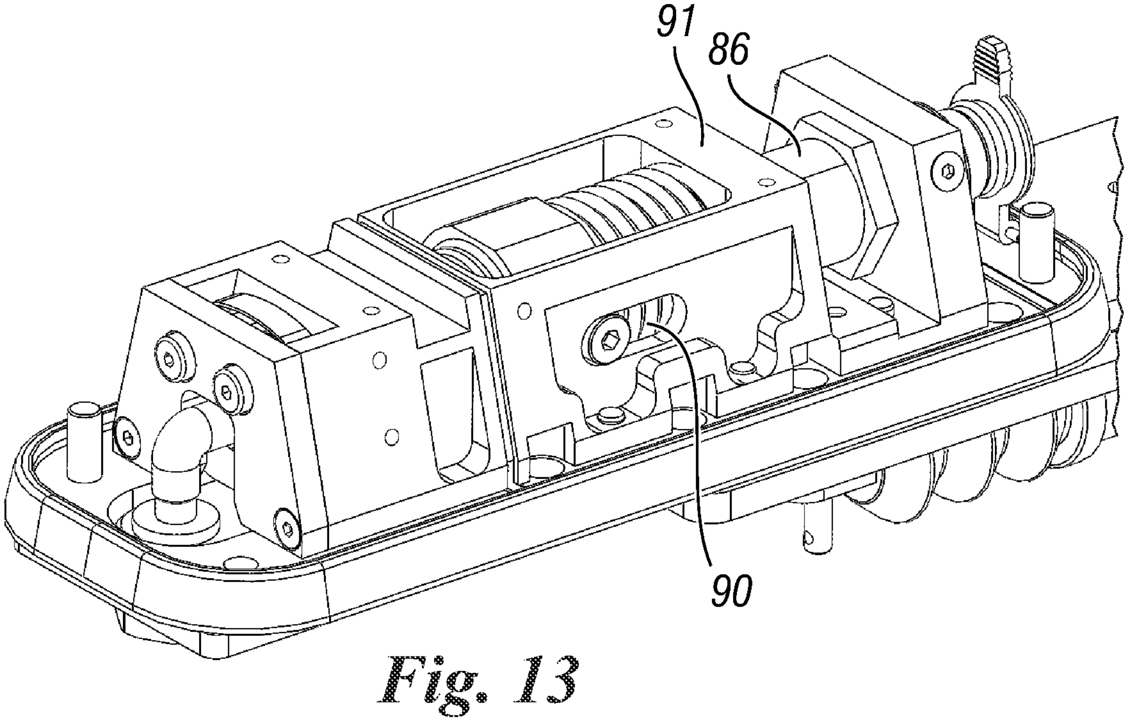
FIG. 13 shows part of a lock, with relative support, in accordance with a variation of the present invention.

Referring to the attached figures, a locking and release system for a lock fitted on a vehicle, in accordance with the present invention, comprises a mechanical lock 10 fixed on a vehicle door; associated with the lock 10 there is an electronic circuit 11 which controls opening and closing of the lock 10 and connection with the other elements of the system.

The electronic circuit 11 comprises a sensor 12 which provides a signal indicating door open and door closed, a Bluetooth communication system 13, an Internet communication system 14 and a GPS localization system 15.

The system is activated by the driver of a vehicle via an application on a smartphone 21 or equivalent electronic device, which comprises a Bluetooth communication system 22, an HTTPS communication system 23 and a GPS localization system 24.

The system further comprises a cloud 30 containing the data for management of said system, which communicates via internet with the electronic circuit 11, and via HTTPS with the smartphone 21, and via HTTPS with the management system 35 of the customer.

The lock 10 is connected with a channel 40 via cable or via radio to the electronic circuit 11. The electronic circuit 11 is connected by means of an internet channel 41 to the cloud 30 and by means of a Bluetooth channel 42 to the smartphone 21. The driver operates the smartphone 21. The smartphone 21 communicates with the cloud 30 by means of the HTTPS channel 44. The cloud 30 communicates with the management system 35 by means of an HTTPS channel 45.

The present invention permits opening of the lock only if certain conditions occur such as:

GPS position of lock (pre-set position for each delivery)

GPS position of smartphone (pre-set position for each delivery)

Pre-authorized smartphone

Preferably, pre-set opening time

The cloud 30 will deal with coordination of the operations, sending the data necessary for correct operation to the electronic circuit 11 of the lock 10 and to the application on the smartphone 21.

The electronic circuit 11 of the lock 10 and the application on the smartphone 21 exchange information with the cloud 30 which, by means of secure communications, will send codes containing the information to control the release according to the above conditions.

Lastly, via the Bluetooth functions of the smartphone 21, the application will send a request for opening of the lock 10 to the electronic circuit 11, which will accept the request only if all the conditions are met.

The "free release" mode allows the driver to independently release the lock within given geographical areas (e.g., in the depot, in the workshop, etc.). A system administrator (customer) can at any time decide to allow free release even if the other conditions have not occurred.

The conditions that can be used to enable the free release are:

Geographical area (a polygon is drawn on the map).

Times of the day (e.g., release allowed from 8:00 to 8:30).

Days of the week (e.g., release allowed from Friday to Sunday).

Arbitrarily from cloud (e.g., customer manager decides to enable it for a fixed or indefinite duration).

The application on the smartphone 21 is designed to be run on Android smartphone with digital fingerprint reader and Bluetooth functions. For ordinary operation, an internet connection is also required.

The application allows the driver to request opening of the lock. Under the procedure, the driver is personally identified in the system via use of the digital fingerprint reader.

Once the system has granted him access to the system, the application communicates with the cloud by means of secure Internet connection (HTTPS).

After the application has sent the data on the position and on the driver, the cloud responds, providing a code which the application will use to create a further code to be sent to the lock during the opening request.

This code contains the information relative to the position of the smartphone, of the driver active on the application, the reference of the delivery to be completed and the release code.

The opening request is sent by the application to the electronic circuit 11 of the lock 10 via Bluetooth. The lock responds, confirming or otherwise the successful outcome of the operation.

In the event of malfunctioning of the system due to non-connection to the cloud, the application is preloaded with a limited number of "emergency release" codes (configurable number) which can open the lock, bypassing the safety system.

The use of an "emergency release" code entails an alarm being sent to the system as soon as the smartphone is able to communicate again with the cloud.

The "emergency release" codes have a limited time validity, and the locks must periodically connect to the cloud to maintain the list of codes updated.

If a lock does not connect to the cloud in time for updating of the emergency codes, they remain valid for an additional period of time to allow opening. However, the smartphone must be online to recover the expired codes (only the "emergency release" codes that have not expired are synchronized on the application).

The number of "emergency release" codes available for each driver can be varied by an authorized user.

The "emergency release" codes consist in codes that are generated by the lock when an authorized user assigns an emergency release code to a smartphone. The code is then saved on the application to be used to open the lock in the event of no signal coverage.

The codes saved on the application are automatically eliminated from the smartphone once they have time-expired. The code remains saved on the lock for a longer time. This means that, to release a lock that has been offline for a long time, the application must be online in order to obtain the code directly.

The cloud 30 is an SaaS (software as a service) which has two main functions: coordinating the lock opening operations, and providing the end customers with an API (application programming interface) to integrate control of the smart locks in their business management software.

The service is structured for multi-user access on several levels. It is possible to assign each user to a group with the relative customizable authorizations.

For safe and complete control of the lock releases, the following functions are required:

Driver management: univocally identify the drivers by creating a personal access (username, password).

Smartphone management: univocally identify the smartphones using the IMEI and associate them with the relative drivers.

Lock management: univocally identify the locks using the IMEI and associate them with the relative drivers/smartphones. Management of the "emergency release" codes.

Delivery management: set the parameters relative to the deliveries to be made (position, time, driver).

Possibility of sending alarms by email/text message when certain conditions occur.

Functions of self-diagnosis and chronological recording of the activities carried out.

The API functions made available for the integration are listed below:

Driver management: reading, modification, creation, elimination.

Smartphone management: reading, modification, creation, elimination, association with driver.

Lock management: reading, modification, creation, elimination, association with driver.

Delivery management: reading, modification, creation, elimination, association with driver.

The cloud application resides in a hosting space (AWS, Google, others). In the cloud database there are no explicit data relative to the drivers or the vans. The historic record of the positions of the vehicles is limited to the minimum necessary for implementing the safety functions, no long-term historic record is saved.

These data are significant only and exclusively if they are crossed with the data in the customer database; therefore only the customer knows data such as first name, surname, vehicle number plate, historic record of position in the last few hours, etc.; the cloud application does not have access to this information since it is physically located in a different and non-accessible place.

To enable a new smartphone, the driver reports to the customer's manager requesting activation of his/her smartphone in the system. The manager installs the application on the driver's smartphone (via link/QR code) and starts the registration procedure on the application, entering the identification code of the company/branch (company code). The application communicates with the cloud sending its own IMEI, GPS position and company code, requesting to be entered in the approval queue. Via the customer management software terminal, the manager completes the customized procedure for entry of the driver and/or the van.

The customer management software asks the cloud for the list of the devices available in the approval queue. Via the customer management software terminal, the manager enables the device by selecting it from the list of those available (at this point the customer could decide to view the GPS position of the smartphone to assist the manager in the selection).

The customer management software sends the driver, smartphone and van association information (anonymous) to the cloud.

The cloud communicates with the application, enabling it.

To enable a new vehicle, the driver goes to the customer's manager with the vehicle license plate number. The manager enters the vehicle data, via the customer management software terminal, and associates it with one or more drivers. The customer management software sends the vehicle/driver association information (anonymous) to the cloud.

To enable the driver to make the deliveries for the day, the driver goes to the customer's manager before starting his/her work shift. The manager confirms the driver's identity and, via the customer management software terminal, authorizes starting of the work shift. The customer management software sends to the cloud the information (anonymous) relative to the deliveries associated with the driver.

To release the lock with the system on line, the driver starts the application, authenticating his/her identity by means of digital fingerprint. The application checks that the fingerprint detected is associated with a valid user. The driver starts the release procedure, selecting the relative delivery from a list. The application communicates to the cloud the data relative to the active user, delivery selected and geolocalization of the smartphone. The cloud, having checked the consistency of the data (e.g., lock position matches smartphone position), saves the operation in the operations register. In the meantime, the lock generates a code and stores the data relative to the opening request, then sends the code generated to the cloud which authorizes the release. The application sends the code to the lock via Bluetooth. The lock extracts the data and performs the validity check, with the data sent from the application and the data received from the cloud. The lock is released. The lock saves locally a record of the operation and sends the outcome to the application and to the cloud. The cloud saves a record of the operation.

For an emergency release, if the system is off line, the driver starts the application, authenticating his/her identity by means of digital fingerprint. The application checks that the fingerprint detected is associated with a valid user. The driver starts the "emergency release" procedure. The application checks in the local list of emergency release codes those that have not yet expired. The driver selects from the proposed list the lock to be opened. The application sends the release code to the lock via Bluetooth. After verifying the validity of the emergency code, the lock is released. The lock and the application save a record of the operation.

For the emergency release, if the release codes have expired, the driver starts the application, authenticating his/her identity by means of digital fingerprint. The application checks that the fingerprint detected is associated with a valid user. The driver starts the "emergency release" procedure. The application checks in the local list of emergency release codes those that have not yet expired. The driver selects from the list the item "lock not in list". The application contacts the Cloud to perform the login. The cloud responds with the list of locks that can be released using an expired code. The driver selects the lock from the list proposed by the application. The application contacts the cloud to obtain the code for emergency release of the lock. Simultaneously it sends the information on the position, on the driver and the lock he wishes to open. The application sends the release code to the lock via Bluetooth. After verifying the validity of the emergency code, the lock is released. The lock saves a record of the operation.

In the various procedures listed above, if something does not correspond or the data are not correct and/or are not those expected, the procedure is blocked and the lock does not open.

The mechanical lock 10 comprises a mushroom-shaped element 50 having a cavity 59, fixed on the fixed door 51 of the vehicle, and a shell 52, which encloses the lock mechanisms, fixed on the movable door 53 of the vehicle. Inside the movable door 53 is an actuator 54 connected to a rod 55 for opening the lock.

Inside the shell 52 is a bolt 56, which locks in the cavity 59 of the mushroom element 50 to close the lock, and which can slide inside a bush 57. Alternatively to the cavity 59 a U-bolt can be used, into which the bolt 56 slides.

The bolt 56 is pressed by a spring 60 of the bolt which abuts inside a cursor 61 which can slide inside the bush 57.

The cursor 61 is pressed by a spring 62 of the cursor which is located between the cursor 61 and a projection of the bush 57.

The rod 55 passes through the movable door 53 and is fixed to the bolt 56.

The bolt 56, the cursor 61 and the springs 60 and 62 are coaxial to one another.

Opposite the system formed of the bolt 56 and the cursor 61 is a block 65 of a manual lock which can be opened by means of a key to be inserted at the end 66 thereof covered by a cap 67.

When the key rotates, it causes a cam 68 positioned at the end 69 of the block 65 to rotate.

The cam 68 operates the cursor 61 and causes it to slide, allowing the bolt 56 to exit the cavity 59 of the mushroom element 50 and open the lock.

In an alternative embodiment of the lock 70, it comprises a height-adjustable U-bolt 71, fixed on the fixed door of the vehicle, and a shell, which encloses the lock mechanisms, fixed on the movable door of the vehicle.

Inside the movable door is an actuator 72 connected to a rod 73 for opening the lock.

When the two doors of the vehicle approach each other and the U-bolt 71 enters the shell, it encounters two jaws 74 which can rotate around relative pins 75, and are normally kept open by a spring 76.

In particular the U-bolt 71 pushes upwards the pair of jaws 74 which approach each other, overcoming the force of the spring 76, until the U-bolt 71 has completely penetrated the shell and the jaws 74 have closed around the U-bolt 71.

The two jaws 74 have external grooves 77, running downwards to obtain greater leverage. When the jaws 74 are closed, two plugs 78 can be inserted in the grooves 77, one on each side.

With the jaws closed, the plugs 78 have space to move forward, fitting into the seats provided by the grooves 77 and block the opening of the jaws 74.

The plugs are operated by the actuator 72 which pushes the rod 73, which is constrained to a fork 80 which, on the one side, retains the two plugs 78, and on the other is pushed by a spring 81 arranged between a fixed support 91 and a cap 83. The cap 83 and the fork 80 are joined to each other.

At the rear end of the lock 70, with respect to the jaws 74, is the keyhole 85 for manual opening if required. The lock 70 comprises a cylinder 86 of the lock connected to a shaft 87 of the manual lock, which is inside the spring 81. The shaft 87 comprises a pair of dowels 88 which can slide along cams 89 positioned on the pin and are fixed to the cap 83 and can slide horizontally along slots 90 positioned on a fixed support 91.

When the key is rotated, the shaft 87 rotates, the dowels 88 are obliged to follow the cam 89 of the shaft 87, and since the dowels slide in the slots 90, the shaft moves forward or back according to the movement of the key and consequently moves the plugs 78.

With the lock closed, the spring 81 maintains the plugs in the blocking position.

To open the lock, the actuator 72 is operated, which pulls the rod 73 and causes the plugs 78 to retract; the jaws can open pushed by the spring 76, moving the U-bolt 71 away from the jaws 74.

The lock 10 and the lock 70 further comprise seals to keep out water and humidity and anti-drilling materials to prevent tampering, located at strategic points of the lock.

The description refers to a system and a method for locking and releasing a lock fitted on a vehicle, but it is clear that said solution can also be applied to the transport of containers, safety cabinets and all applications in which it is necessary to control access, granted only to authorized persons, to the goods located inside a closed container.

The invention claimed is:

1. A locking and release system of a lock fitted on a vehicle having a driver, comprising:

a mechanical lock (10, 70) which is fixed on a door of a vehicle;

an electronic circuit (11) associated with said lock (10, 70) in said vehicle, wherein said electronic circuit is adapted to control opening and closing of said lock (10, 70);

said electronic circuit (11) comprises a Bluetooth communication device (13); an Internet communication device (14); a Global Positioning System (GPS) localization device (15);

said system further comprises:

a cloud (30) containing the data for the management of said system;

a management centre (35) of said system; said management centre (35) is adapted to communicate with said cloud (30);

a smartphone (21); said smartphone (21) comprises a Bluetooth communication device (22); a Hypertext Transfer Protocol Secure (HTTPS) communication device (23); and a GPS localization device (24);

said electronic circuit (11) and said smartphone (21) are adapted to communicate with said cloud (30) respectively via said Internet communication device (14) and said HTTPS communication device (23);

said smartphone (21) is adapted to communicate with said electronic circuit (11) via said Bluetooth communication device (22);

said smartphone (21) comprises an application, said application is adapted to request opening of said lock, and said opening request is sent by the driver of the vehicle from said application to said electronic circuit (11) via said Bluetooth communication device (22);

said cloud (30) is adapted to enable an exchange of information between said electronic circuit (11) and said application;

said electronic circuit (11) accepts said request and opens said lock (10, 70) if the following conditions are met:

a GPS position of the lock (10, 70) coincides with a delivery position;

a GPS position of the smartphone (21) coincides with the delivery position;

said smartphone (21) is recognized by the system;

said lock comprises coupling means (56, 74), located on a first door adapted to close against closing means (59, 71) located on a second door and locking means (60, 78) adapted to lock said coupling means (56, 74) in the closed position.

2. The system according to claim 1 wherein said lock (10, 70) opens if an opening time corresponds to a set time.

3. The system according to claim 1 wherein said smartphone (21) is recognized based on its International Mobile Equipment Identity (IMEi), which is inserted in a list present in said cloud (30).

4. The system according to claim 1 wherein said electronic circuit (11) comprises a sensor (12) which provides a signal indicating door open and door closed.

* * * * *